United States Patent [19]

Lim et al.

[11] Patent Number: 5,491,342

[45] Date of Patent: Feb. 13, 1996

[54] APPARATUS AND METHOD FOR NUCLEAR CAMERA CALIBRATION

[75] Inventors: Chun B. Lim, Moreland Hills; Barry D. Kline, Cleveland Heights; Jinghua J. Jiang, Streetsboro; Vitaliy Rappoport, Mayfield Heights, all of Ohio

[73] Assignee: Trionix Research Laboratory, Inc., Twinsburg, Ohio

[21] Appl. No.: 338,438

[22] Filed: Nov. 10, 1994

[51] Int. Cl.$^6$ .......................... G01T 1/161; G12B 13/00
[52] U.S. Cl. .............................. 250/363.09; 250/363.07; 250/252.1
[58] Field of Search ............ 250/363.09, 363.07, 250/252.1 R, 369, 367

[56] References Cited

U.S. PATENT DOCUMENTS

| | | |
|---|---|---|
| 4,256,960 | 3/1981 | Snider . |
| 4,323,977 | 4/1982 | Arseneau . |
| 4,424,446 | 1/1984 | Inbar et al. . |
| 4,517,460 | 5/1985 | Meulerbrugere et al. ......... 250/363.09 |
| 4,808,826 | 2/1989 | Lim et al. . |
| 4,817,038 | 3/1989 | Knoll et al. . |
| 4,899,054 | 2/1990 | Barfod . |
| 5,055,687 | 10/1991 | Ichihara . |
| 5,173,608 | 12/1992 | Motomura et al. . |
| 5,185,529 | 2/1993 | Smith et al. . |
| 5,235,528 | 8/1993 | Silver et al. . |
| 5,237,173 | 8/1993 | Stark et al. ........................ 250/363.09 |
| 5,345,082 | 9/1994 | Engdahl et al. ................... 250/363.09 |

OTHER PUBLICATIONS

"Testing an Improved Scintillation Carmera for PET and SPECT", Rogers, J. G., IEEE Transactions on Nuclear Science, vol. 33, No. 1, pp. 519–522, Feb. 1986.

Primary Examiner—Constantine Hannaher
Assistant Examiner—Virgil O. Tyler
Attorney, Agent, or Firm—Pearne, Gordon, McCoy & Granger

[57] ABSTRACT

A gamma camera is calibrated at different photon energies to provide several different calibration arrays. The calibration arrays are used to correct the camera image according to the energy of the photons detected from the body to be examined. The calibration array obtained from the photons having an energy closest to the photons detected from the body may be used. Another alternative is to form an interpolation array based on two or more calibration arrays obtained with photons having energies bracketing those from the body.

10 Claims, 4 Drawing Sheets

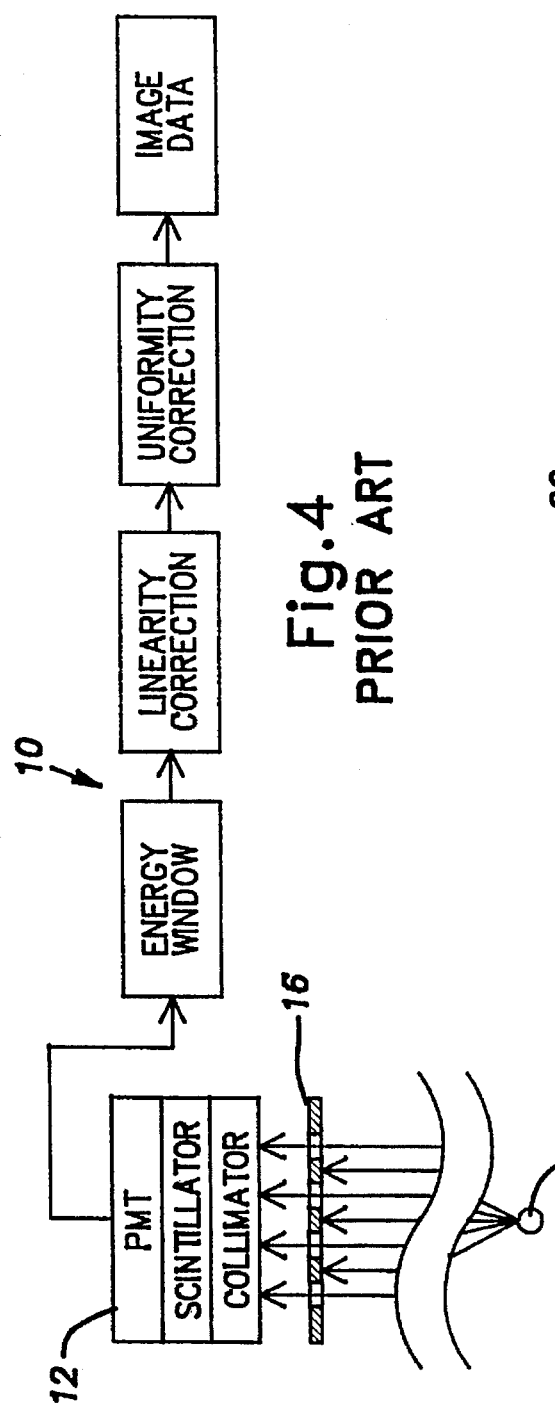
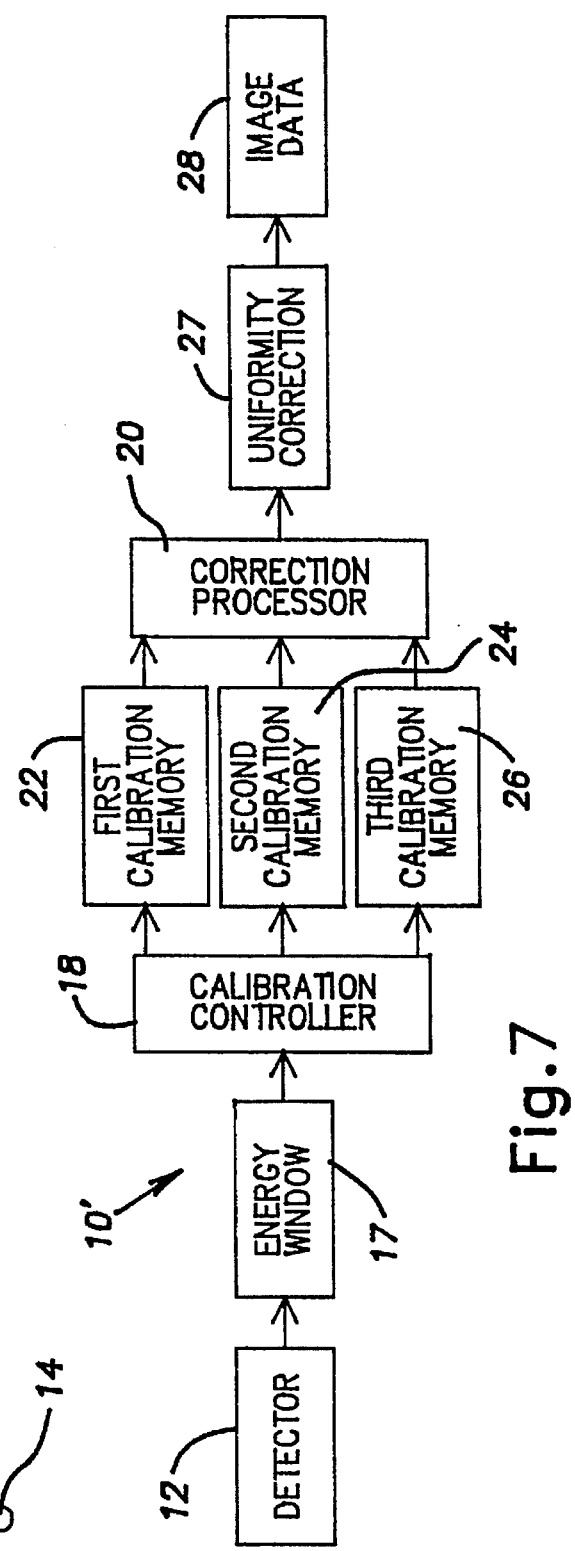

APPARATUS AND METHOD FOR NUCLEAR CAMERA CALIBRATION

BACKGROUND OF THE INVENTION

The present invention relates to the calibration and correction of images produced by a gamma camera and, in particular, to the correction of energy-dependent spatial distortion errors.

Gamma cameras are typically subject to three types of errors. The first of these errors is spatial non-linearity.

Non-linearity is caused by phenomena known as "coordinate bunching," whereby scintillation events are mistakenly positioned towards the center of the photomultiplier tubes (PMTs). At a particular γ-ray energy this positional error has two main causes: the collection efficiency of the PMTs vary non-linearly based on relative position of the scintillation events to the photocathodes; and variation in sampling the scintillation events occurs because a discrete number of PMTs are used to report events that occur over a continuous crystal surface.

The second type of error is non-uniformity. The main source of non-uniformity is again spatial distortion errors, which lead to variation in comparative pixel sizes.

Referring to FIG. 1, an ideal pixel has dimensions a x a. If the pixel is illuminated by γ-rays having flux N. Then the count density in the pixel equals $$d = N/a^2.$$

If the spatial distortion results in changing a to a±Δa (FIG. 2), then the resulting density is equal to:

$$d' = N/(a \pm \Delta a)^2 \sim d/(1 \pm 2\Delta a/a)$$

Thus, 1% spatial distortion would result in approximately 2% density error, or, in a 2% spatial non-uniformity.

The third type error is energy-dependent error. Energy-dependent errors are primarily the result of differing penetration/absorption depths within the scintillation crystal for γ-rays of different energies.

For a scintillator crystal of density ρ, the γ-ray intensity I remaining after traversal of a thickness t is given by:

$$I = I_0 \exp(-t\rho/\lambda),$$

where $I_0$ is the γ-ray intensity before the crystal, and λ is the γ-ray mean free path in the crystal and is energy dependent. Referring to FIG. 3, the function $I/I_0$ is plotted for various γ-ray (or photon) energies for a thickness of 9.5 mm.

This varying interaction depth results in different solid angle geometries with respect to the PMTs. This changes the effective acceptance angle for each tube. Therefore the coordinate bunching behavior of the detector varies with γ-ray energy.

U.S. Pat. Nos. 4,424,446, 4,808,826 and 4,817,038 show known methods and apparatus for correcting gamma camera errors and are incorporated herein by reference as if fully set forth herein.

Referring to FIG. 4, a prior art gamma camera 10 is typically calibrated by illuminating the detector 12 of the camera with a uniform calibration source 14 of photons of a particular energy, for example, 140 KeV. A calibration mask 16 containing a precise grid of holes is placed between the detector and the source. An image of the mask is compared to the actual hole geometry and an array of position or linearity corrections corresponding to each point in the image is calculated. In these prior art cameras, the same corrections are used whether the photons of interest are at the calibration energy or at a much different energy. Actual energies of interest may range, for example, from 50 to 511 KEV.

Unfortunately, for the reasons discussed above, these corrections are not constant with respect to photon energy. This results in imaging errors for photons at energies different than that of the calibration photons.

Referring to FIG. 5, an image of a calibration mask is shown using a Tc99m source after calibration for a Tc99m source (140 KeV). FIG. 6 shows an image of the same mask produced by a Ga67 source (93, 184 and 296 KeV) using the Tc99m calibration. Distortion of the image is apparent.

SUMMARY OF THE INVENTION

The present invention provides reduction of energy-dependent spatial distortion errors, as result, improved imaging accuracy over a wide range of γ-rays energies.

The invention includes a method for operating a gamma camera for detecting photons of a known energy emitted from a radioisotope given to a body to be examined. The camera has a detector and is operated by illuminating the detector with a calibration photon source having a first energy. From this illumination, a first calibration array is determined. The detector is also illuminated by the same or a different photon source emitting photons having a second energy different from the first energy. From this illumination, a second calibration array is determined.

Photons from the body to be examined are detected by the detector in the form of an imaging array and the imaging array is corrected in accordance with the calibration arrays.

The gamma camera according to the invention includes the detector for detecting photons, a first memory for storing the first calibration array; and a second memory for storing the second calibration array. It also includes a calibration controller for determining the first and second calibration arrays from detection of the first calibration photon source and the second calibration photon source, respectively. It further includes an energy correction processor for correcting the imaging array detected from the body, the imaging array being corrected in accordance with the calibration arrays.

BRIEF DESCRIPTION OF THE DRAWINGS

FIG. 4 is a block diagram of a gamma camera according to the prior art.

FIG. 7 is a block diagram of a gamma camera according to the invention.

DESCRIPTION OF THE PREFERRED EMBODIMENTS

Figure 1:
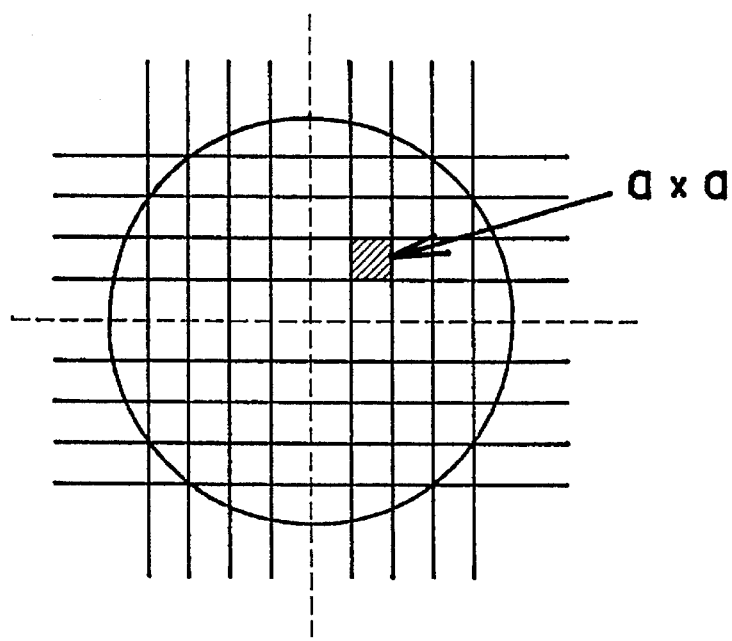
FIG. 1 is a graphical diagram illustrating an ideal uniform pixel.
Figure 2:
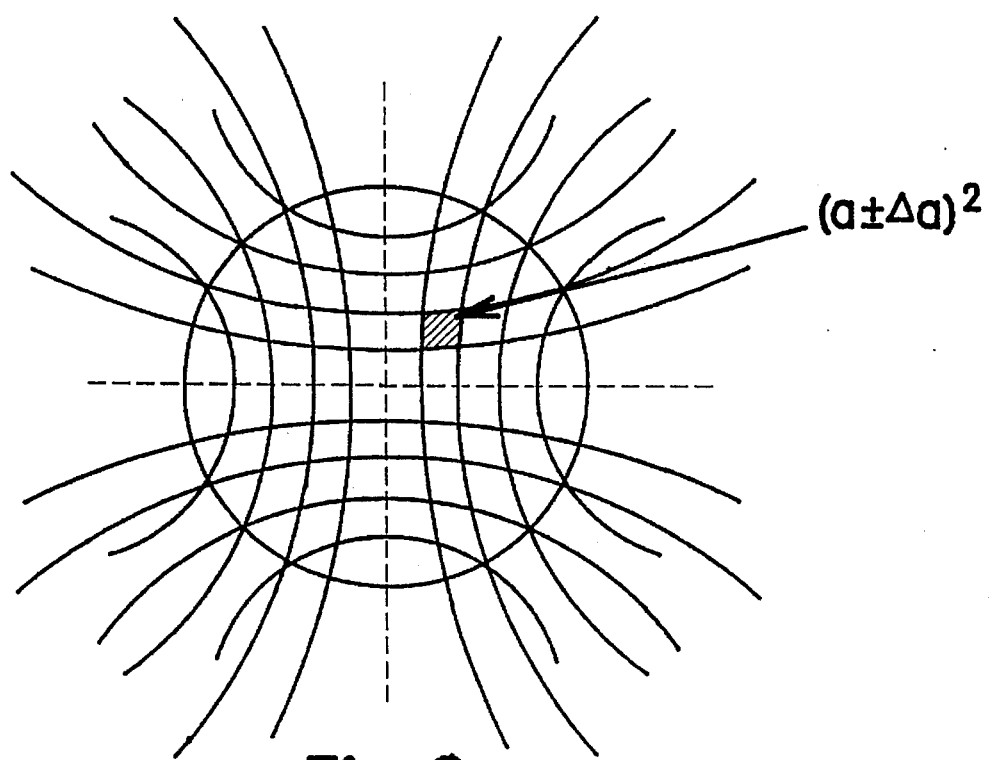
FIG. 2 is a graphical diagram illustrating the effect of spatial distortion on uniformity.
Figure 3:
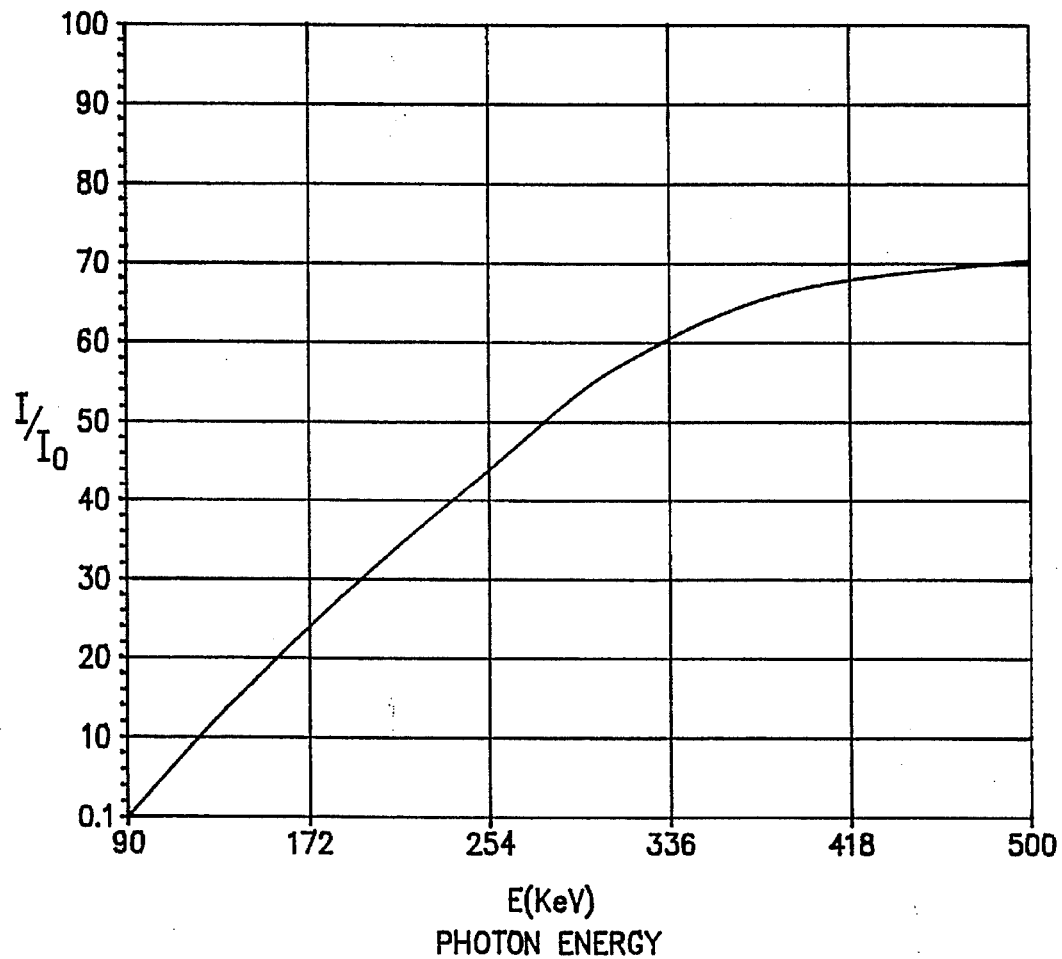
FIG. 3 is a graphical diagram of the fraction of γ-ray flux penetration as a function of γ-ray energy.
Figure 5:
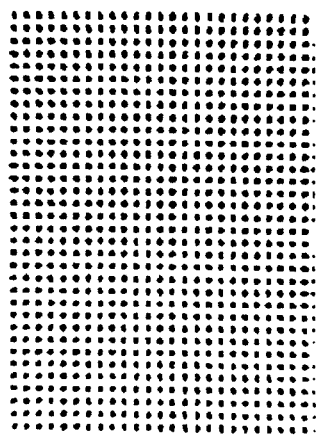
FIG. 5 is a prior art image with identical calibration source and image source γ-ray energies.

Referring to FIG. 7, a gamma camera 10' includes a detector 12 which includes a collimator, scintillator and photomultiplier tube array. The output of the detector 12 is connected to an energy window processor 17. The energy window processor 17 is connected to a calibration controller 18. The energy window processor and calibration controller 18 may be, for example, separate microprocessor-based computers, microprocessor-like hardware designed for a specific processing routine or a single such computer.

Typically, the energy window processor 17 sums the output of the photomultiplier tubes to estimate the total energy of the detected photon and provides this estimate to the calibration controller 18.

The calibration controller 18 is in communication with a first energy calibration memory 22, a second energy calibration memory 24 and a third energy calibration memory 26. The memories 22, 24, 26 may be, for example, random access memory, electrically erasable read only memory, computer disk drives, or similar re-writable memories.

The memories 22, 24, 26 are in communication with a energy correction processor 20. The energy correction processor 20 provides corrected data to a uniformity correction processor 27. The uniformity correction processor provides image data 28. The energy correction processor 20 and uniformity correction processor may be, for example, separate microprocessor-based computers, microprocessor-like hardware designed for a specific processing routine or a single such computer. The image data 28 may be in the form of an image array displayed on, for example, a cathode ray tube, or an image array used by additional analytical equipment.

To operate the camera 10', the detector 12 is illuminated by a low energy calibration photon source. The source may be, for example, a 140 KeV source providing a uniform source of photons over the field of view of the detector 12.

It is well-known in the art that the image data 28 produced by the calibration source can be filtered for energies lying within windows of interest and corrected for linearity and uniformity errors. These corrections can be, and often are, expressed as an array of values for linearity and uniformity corresponding to different two-dimensional spacial locations in the image data. This resulting calibration array is only accurate for photons having an energy at or near that of the calibration source.

The first energy (e.g., low energy) calibration array is determined according to prior art methods and stored by the calibration controller 18 in the low energy calibration memory 22.

Similarly, the detector 12 is illuminated by a medium energy calibration photon source. The source may be, for example, a 200–300 KEV source. The medium energy calibration array is determined and stored by the calibration controller 18 in the second (e.g., medium) energy storage calibration memory 24.

Similarly, the detector 12 is illuminated by a high energy calibration photon source. The source may be, for example, a 350–400 KEV source. The high energy calibration array is determined and stored by the calibration controller 18 in the third (e.g., high) energy storage calibration memory 26.

It is also possible to use a calibration source that emits γ-rays having more than one known energy. The energy window processor 17 selects the photons of the desired energy for each calibration.

Once the various energy level calibrations have been determined and stored, the camera 10' may be used to image a body 30 to be examined. Prior to imaging, the body 30 has been given a radioisotope that emits photons of a known energy.

To achieve the improved imaging accuracy of the invention, the energy correction processor 20 uses the calibration arrays stored in the memories 22, 24, 26 to adjust the calibration of the camera 10' according to the relationship between the energies used to obtain the calibration arrays and the energy of the photons from the body 30. The energy window processor 17 ensures that photons of the proper energy are passed to the calibration controller 18.

The energy correction processor 20 may use several different methods for determining the proper correction array to use. For example, the energy correction processor 20 may use the calibration array corresponding to the calibration source having an energy closest to that of the photons from the body 30.

Alternatively, the correction processor 20 may interpolate between the calibration arrays to create an interpolation array that more closely approximates the "true" calibration array for photons having the same energy as those emitted by the body 30.

This interpolation may be, for example, linear or polynomial by using a maximum likelihood method to determine the array closest to the "true" values.

After correction of the data from the detector 12, the energy correction processor 20 provides corrected data to the uniformity correction processor 27 which perform uniformity corrections well-known in the art before providing the image data 28 for viewing or further processing.

In the preferred embodiment, three calibration arrays are used, but it is possible to use only two calibration arrays corresponding to two different calibration energies. This provides less accurate results, but is simpler. It also may be desirable to use more than three calibration arrays, each obtained from a calibration source having a different energy (or one or more sources having multiple energies). The more calibration arrays used, the more accurate the results, because interpolation errors are minimized.

It is of course possible to use the present invention on bodies emitting photons of more than one known energy. The energy window processor 17 determines the energy of the photons detected and the appropriate energy correction is then applied. The resulting image data 28 is the combination of all of the detected photons from the body 30.

Figure 6:
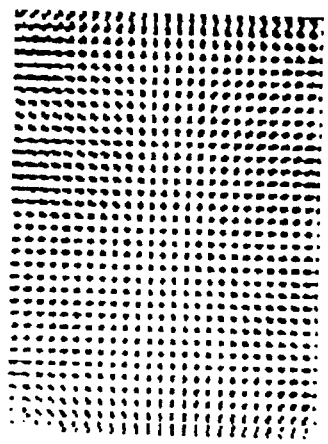
FIG. 6 is a prior art image with differing calibration source and image source γ-ray energies.
Figure 8:
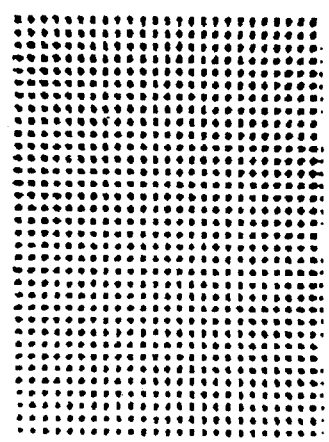
FIG. 8 is an image according to the invention using the image source of FIG. 6.

FIG. 8 shows an image of a calibration mask using a Ga67 source (three energies: 93, 184 and 296 KeV) after the camera 10' was calibrated for these three energies using a Ga67 calibration source. The resulting image is much better than the image of FIG. 6 which was based on only a 140 KeV calibration source.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for operating a gamma camera for detecting photons of a known energy emitted from a radioisotope given to a body to be examined, said camera having a detector, said method comprising:

illuminating said detector with calibration photons having a first energy;

determining a first calibration array in response to said first energy photons;

illuminating said detector with calibration photons having a second energy different from said first energy;

determining a second calibration array in response to said second energy photons;

detecting photons from said body with said detector in an imaging array; and correcting said imaging array in accordance with said calibration arrays.

2. A method according to claim 1, further comprising selecting one of said calibration arrays, said selected calibration array corresponding to the calibration photons having the energy nearest to said known energy, and correcting said imaging array in accordance with said selected calibration array.

3. A method according to claim 1, further comprising determining an interpolated calibration array, said interpolated calibration array being formed from a combination of said first and second calibration arrays as a function of said calibration photon energies, and correcting said imaging array in accordance with said interpolated calibration array.

4. A method according to claim 1, further comprising:

illuminating said detector with calibration photons having a third energy different from said first and second energies; and determining a third calibration array in response to said third energy photons.

5. A method according to claim 1, further comprising providing a single calibration source for providing said calibration photons of said first and second energies.

6. A method according to claim 1, further comprising detecting photons having more than one known energy from said body.

7. A gamma camera for detecting photons of a known energy emitted from a radioisotope given to a body to be examined, said camera comprising:

a detector for detecting photons;

a first memory for storing a first calibration array;

a second memory for storing a second calibration array;

a calibration controller for determining said first and second calibration arrays from detection of calibration photons having a first energy and calibration photons having a second energy, respectively, said first energy being different from said second energy; and an energy correction processor for correcting an imaging array detected from said body, said imaging array being corrected in accordance with said calibration arrays.

8. A gamma camera according to claim 7, wherein said correction processor selects one of said calibration arrays, said selected calibration array corresponding to the calibration photons having the energy nearest to said known energy, and corrects said imaging array in accordance with said selected calibration array.

9. A gamma camera according to claim 7, wherein said correction processor determines an interpolated calibration array, said interpolated calibration array being formed from a combination of said first and second calibration arrays as a function of said calibration photon energies, and corrects said imaging array in accordance with said interpolated calibration array.

10. A gamma camera according to claim 7, further comprising:

a third memory for storing a third calibration array; and determining from said calibration controller said third calibration array from detection of calibration photons having a third energy, said third energy being different from said first and second energies.

* * * * *